April 8, 1969         M. A. SULLIVAN         3,437,547
LAMINATED BALSA STRUCTURE AND METHOD
Filed June 7, 1965

INVENTOR.
MATTHEW A. SULLIVAN
BY Seidel & Gonda
ATTORNEYS.

United States Patent Office 3,437,547
Patented Apr. 8, 1969

3,437,547
LAMINATED BALSA STRUCTURE AND METHOD
Matthew A. Sullivan, 535 Davisville Road,
Willow Grove, Pa. 19090
Filed June 7, 1965, Ser. No. 461,629
Int. Cl. B32b 3/16, 3/02, 23/08
U.S. Cl. 161—40                                    7 Claims

ABSTRACT OF THE DISCLOSURE

A laminated composite material is provided wherein a flexible polymer film is disposed between and adhered to a pair of balsa sheets, the adhesive means joining the polymer film to the balsa sheets serving to bind the sheets and film in an integral relationship providing a lightweight, durable, strong and easily workable material.

---

This invention relates to a laminated balsa structure, and more particularly to a laminated balsa structure for model building, furniture, and like articles of manufacture; and in particular to a laminated balsa material which is lightweight, durable, strong and easily workable.

Balsa has proved to be a very popular and practical material for the building of models and other articles of manufacture because of its unique characteristics. It is lightweight and very easy to work and shape. These characteristics have been utilized to advantage in model airplane construction, particularly the light weight when a flying model is desired. Unfortunately, the commercially available balsa at present, although supplied in sufficient lengths, can be supplied only in relatively narrow widths. Balso in widths greater than three inches is at a premium. Furthermore, balsa has an undesirable characteristic in that it is structurally weak along the grain, having a tendency to split or separate there.

Therefore, to overcome the foregoing and other difficulties of the prior art, the general object of this invention is to provide a new and better material for model making, and other articles.

It is an object of this invention to provide a building material which is lightweight, durable, strong and easy to shape and work.

Another object of this invention is to provide a laminated balsa material which eliminates weakness along the balsa grain and provides strength in all directions.

A further object is to economically provide balsa in any desired width.

Another object is to provide a laminated balsa material which is economical to produce and which utilizes conventionally currently available materials that lend themselves to standard mass production manufacturing techniques.

Other objects will appear hereinafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description and claims, taken in conjunction with the accompanying drawings in which:

Figure 1:
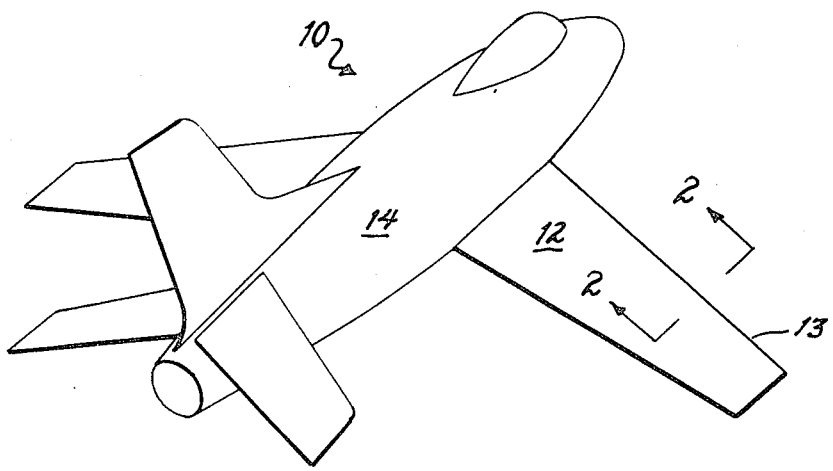
FIGURE 1 is a perspective view of a model airplane constructed of the invented material.
Figure 2:
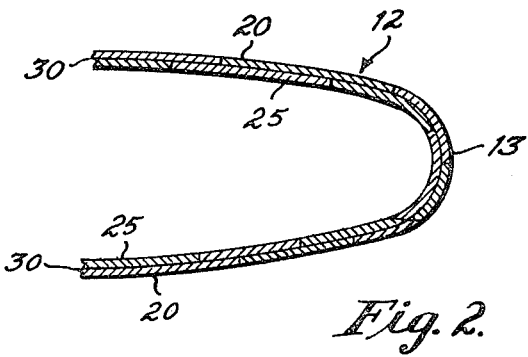
FIGURE 2 is a partial cross section taken along line 2—2 in FIGURE 1 showing a portion of the wing leading edge.

Referring to the drawings in detail, wherein like numerals indicate like elements, there is shown in FIGURE 1 a drawing of a model airplane, designated generally as 10, which has been constructed of the invented material. The model 10 shown is only typical having a wing 12 and fuselage 14. The wing 12 has a plane curved to a leading edge 13 to provide a typical air foil section. Fuselage 14 is a compound curved shape. In the past, paper and/or fabric have been used to cover these curved and compound curved surfaces.

It is proposed to furnish a typical model 10 in a kit form comprising various preformed blanks corresponding to the various model components such as the wing 12 and fuselage 14. Naturally, it is desirable that the component blanks be of a material which is easily worked and shaped by an amateur home model maker. Also, it is desirable that the material be lightweight, durable and strong. Such a material is the subject matter of this invention which will be described hereinafter.

Figure 3:
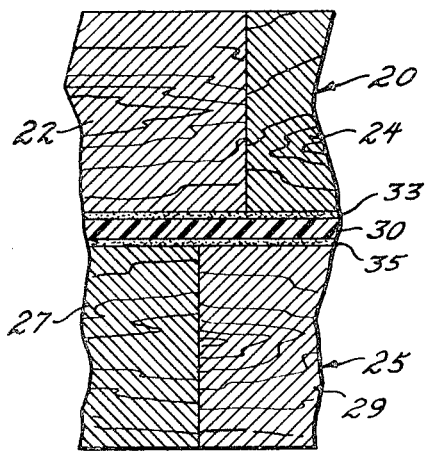
FIGURE 3 is an enlargement of portion of FIGURE 2 showing details of the laminated balsa material.

The invented material is a laminate of balsa layers 20, 25 having a polymer film 30 therebetween. A wide variety of high strength polymeric films may be used including Mylar polyester film, polypropylene film, Lexan (a carbonate linked polymer produced by reacting bisphenol A and phosgene), etc. By way of example, the polyester film Mylar is used as set forth below. The layer 20 is a plurality of narrow balsa sheets 22 and 24, which by way of example may be each of 1/32 inch thick, abutting along their lengths, which may be visualized best by reference to the enlargement of FIGURE 3. Layer 25 is likewise of a plurality of narrow balsa sheets 27 and 29. It is not necessary that abutting sheets, such as 22, 24 be bonded together. It is preferable that all abutting sheets in a layer have a common thickness to provide a continuous surface for each layer. As illustrated, the layers 20, 25 are in an overlaying relationship. It is desirable, that the various balsa sheets 22, 24, 27 and 29 have an overlapping relationship with respect to each other so as to avoid the weakness of an open joint continuing completely through the laminate. In the interest of saving space on the drawing, a very small amount of overlap is shown in FIGURE 3, however, it is understood that a much greater amount of overlap is desirable.

The polyester film 30 completely covers the continuous surfaces of each layer 20 and 25. Film 30 must be extremely durable and strong and also be of extreme thinness, as by way of example on the order of one thousandth of an inch. A most suitable film is provided by polymerized ethylene glycol terephthalate (Mylar). An adhesive lamina 33 and 35 is provided between the polyester film 30 and the continuous surface of layers 20 and 25 to bind together a thereby formed laminate of balsa.

In the past, to attain strength, balsa laminates required biasing of the grain of the various layers. In the subject invention, sufficient strength is provided by the polyester film 30, and therefore, the direction of the grain in both layers 20, 25 may be the same so as to achieve maximum bending. For maximum rigidity the grains in the plies of balsa may be cross-grained or perpendicular to each other.

The polyester film 30 is available from commercial suppliers in adequate lengths and widths and also coated with a pressure sensitive adhesive at one or both sides.

Various curved and complex curved component blanks may be provided by the aforedescribed laminate. A first layer 20 of balsa is provided along an inside curved surface of a mold (not shown). Heat and moisture may be utilized to provide a more complex curve. Naturally, the thin balsa sheets 22, 24 can be bent to a much smaller radii than correspondingly thicker sheets. After the layer 20 is suitably assembled and bent to present a curved continuous surface, the polyester film 30, coated on both sides with a pressure sensitive adhesive, is placed to cover the aforementioned curved surface. A second layer of balsa 25 is placed over the polyester film 30. A mold form (not shown) provides pressure squeezing the layers 20, 25 against the adhesive laminate 33, 35 on both sides of the polyester film 31. Thus, a component blank having a curved surface is formed. It is understood, of course, that the laminate is not necessarily limited to two layers and that any number of additional layers may be bonded together in a similar manner. Furthermore, if a curved surface is not desired, the balsa laminate may consist of a single layer 20 and polyester film 30 bonded thereto. It is to be noted that any desired width of balsa may be produced by bonded layers having sufficient abutting balsa sheets.

The component blanks and laminated material thus produced may be still shaped and worked in the same manner as a solid balsa piece. That is, it may be cut, sanded, and finished in a normal manner. During the finishing thereof, by dope of paint, it is to be noted that the dope or paint will flow between the unbonded balsa sheets such as 22, 24 to provide a filler and bond therebetween. Furthermore, the great strength of the invented laminate allows a model to be built with less balsa, thereby eliminating critical weight without a loss of strength.

I claim:

1. A manufactured material comprising: a plurality of balsa sheets having edges in overlapping relation and having continuous faces thereon; the direction of the grain in respective sheets being generally parallel; a flexible polymer film between said sheets covering the surface thereof; and adhesive laminae between said surfaces and film to bind all together in an integral relationship providing a single piece of lightweight, durable and strong material which is easily workable.

2. A material according to claim 1 wherein said surfaces have a desired curve, said film and adhesive laminae holding said curve in said material.

3. A manufactured material comprising: a plurality of abutting balsa sheets in a first layer presenting a single continuous surface; a plurality of abutting balsa sheets in a second layer presenting a single continuous surface, said first and second layers being in an overlying relationship; a flexible polymer film between said layers covering said continuous surface of each layer; and an adhesive lamina between said film and continuous surface of each layer to bind all together in an integral relationship providing a single piece of lightweight, durable, strong and easily workable composite material.

4. A composite material according to claim 3 wherein said flexible film is a polymerized ethylene glycol terephthalate and said adhesive lamina is provided by a pressure sensitive contact adhesive on opposite surfaces of said film.

5. A composite material according to claim 3 wherein said sheets of said first layer are overlapping said sheets of said second layer.

6. A method of fabricating a laminated balsa material comprising the steps of: placing balsa sheets of common thickness in an abutting relationship to present a single continuous surface thereof; placing a flexible polymer film on said surface, said film having a side contiguous with said surface, said side being covered with a pressure sensitive contact adhesive; and applying pressure on said film and sheets causing said adhesive to bind all together in an integral relationship providing a single piece of lightweight, durable, strong and easily workable material.

7. A method of fabricating a laminated balsa blank comprising the steps of: placing balsa sheets of common thickness with an abutting relationship in a curved mold to present a single continuous curved surface thereof; placing a flexible polymer film on said surface, said film having opposite sides covered by a pressure sensitive contact adhesive; placing balsa sheets of common thickness in an abutting relationship to cover said film; and applying a pressure on said sheets and film causing said adhesive to bind all together in an integral relationship providing a lightweight, durable, strong and easily workable component blank.

References Cited

UNITED STATES PATENTS

| | | | |
|---|---|---|---|
| 2,562,976 | 8/1951 | Winnick | 161—38 |
| 2,743,465 | 5/1956 | Vogel | 156—196 XR |
| 2,961,365 | 11/1960 | Sroog | 161—232 XR |
| 2,993,822 | 7/1961 | Reeves | 161—232 XR |
| 3,030,251 | 4/1962 | Bore et al. | 161—232 XR |

FOREIGN PATENTS 881,448  11/1961  Great Britain.

ROBERT F. BURNETT, *Primary Examiner.*

W. A. POWELL, *Assistant Examiner.*

U.S. Cl. X.R.

161—37, 38, 42, 56, 60, 125, 231; 156—196, 245, 297